June 24, 1930. W. S. BREMER 1,765,753
PIPE UNION
Filed July 8, 1927
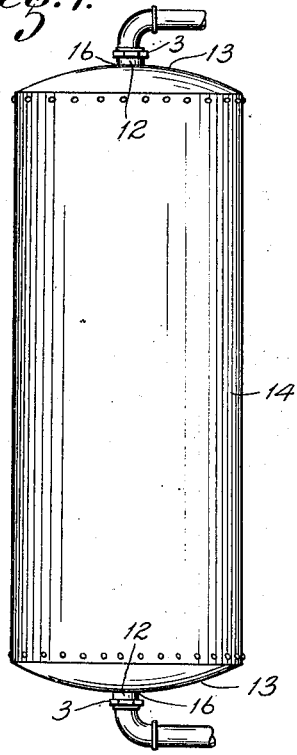
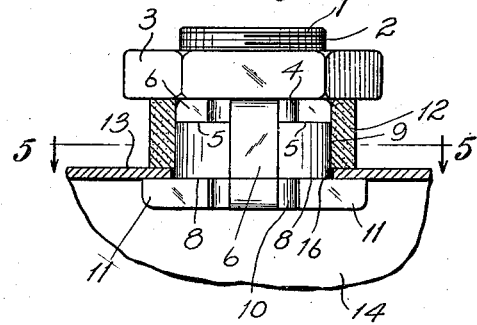
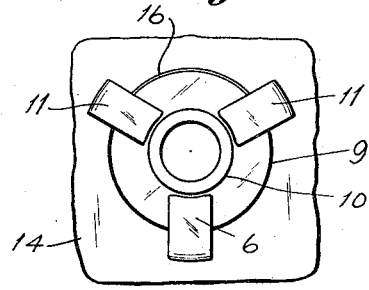
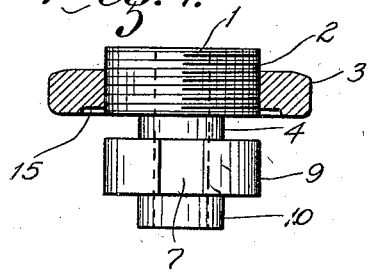
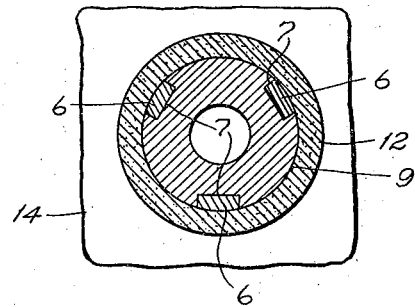
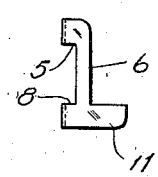
INVENTOR:
WILLIAM S. BREMER.
By W. L. Dempsey
ATTORNEY.

Patented June 24, 1930

1,765,753

UNITED STATES PATENT OFFICE

WILLIAM S. BREMER, OF ST. CHARLES, MISSOURI, ASSIGNOR TO ECONOMY ALUMINUM COMPANY, A CORPORATION

PIPE UNION

Application filed July 8, 1927. Serial No. 204,266.

My invention relates to pipe unions and specifically to that class of unions used for making connections between a pipe and a tank or other closed vessel.

The primary object of my invention is to produce a pipe union that can be directly connected to a closed tank or the like from the outside without the use of bolts, rivets or flanged connections.

Other and further objects and advantages of my invention will be apparent from the specification, claims and drawings, which:

Fig. 1 is an elevation of a tank, showing my union in use.

Fig. 2 is a view of my union connected to a tank, partly in section and partly broken away.

Fig. 3 is an end view of my improved union shown on the inside of the tank, partly broken away.

Fig. 4 is an elevation of my improved union partly in section.

Fig. 5 is a cross section along the line 5—5 in Fig. 2.

Fig. 6 is a side view of a holding member of my improved union.

A pipe connection usually used in connecting a pipe to an air and water tight tank consists of a flanged member riveted to the head of the tank before the head is joined to the body of the tank. The objection to this method is that it not only entails greater cost to manufacture, but the rivets holding the flanged member to the head of the tank are often loosened when the pipe is screwed up tightly to the tank, and especially so when the tank has been in service a long time and repairs are necessary, owing to the rust and corrosion the strain necessary to loosen the joints works the rivets loose, causing leaks which often make the tank unfit for further use.

By the use of my improved union the head of the tank is more cheaply made and the rivets are not loosened and strained when attempting to tighten up or loosen the joints.

My improved union consists of a main hollow, cylindrical body 1, the upper portion 2 of which is externally screw-threaded adapted to engage an internally screw-threaded nut 3. The main body portion 1 is concentrically grooved at 4, just below the threaded portion 2, the groove 4 having straight parallel sides adapted to receive and hold against shoulders 5 a plurality of members 6 when they are inserted in the longitudinal grooves 7. Other shoulders 8 on the members 6 are adapted to closely fit upon the straight sides of a portion of the body 1 designated as 9, which is of slightly less diameter than the screw-threaded portion 2.

The lower end 10 of the body 1 is reduced in diameter to the same diameter as the grooved portion 4. The lower end 11 of the member 6 is turned at a right angle to its major axis and is adapted to grip and hold on the inside of a tank when inserted therein, as shown in Fig. 2 and 3.

A hollow washer 12 made a rubber or other resilient material having a diameter of sufficient size to snugly fit the main body portion 1 is shown in position in Fig. 2 and contacts with the external surface 13 of the tank 14 at its lower end and with the concentric groove 15 on the under side of the nut 3.

When the nut 3 is tightly screwed down it presses down the washer 12 and thus effectively prevents leakage of the contents of the tank.

The members 6 are of uniform size and shape, and when it is desired to attach the union to a tank the members 6 are hooked about the marginal edge of a circular opening in the head of the tank as at 16, and are then closed down in the grooves 7 so that they lay parallel with the major axis of the body portion 1, and the shoulders 5 snugly fit the straight sides of the groove 4.

When my improved union is used for attaching pipe to a tank as shown in Figure 1, the entire overall length of an inch pipe connection is but slightly over 1 inch, while the ordinary unions now in use are approximately 3 inches in length for this size pipe.

It is also readily apparent that the cost of constructing a head of a tank is materially less when a plain opening is made therein than if the opening is surrounded by a flanged portion riveted to the head of the tank.

Having fully described my invention, what I claim as new and useful and desire to protect by Letters Patent is:—

A pipe union of the class described, comprising detachable members, an internally screw threaded nut and a hollow, cylindrical body portion having a relatively deep concentric groove intermediate of its ends, said groove having straight side walls at right angles to the major axis of said body portion, the upper end of said body portion being externally screw-threaded and engaging like threads in the nut and having its opposite end of a reduced external diameter, the portion of the body between the said groove and said reduced end having a plurality of longitudinal grooves disposed at equal distances apart about its periphery which receives and holds said detachable members, said detachable members having plain-faced shoulders lying opposite each other in the same plane, said detachable members having their lower portions L-shaped so that when inserted in an opening of a tank the bottom of the L-shaped portions contact with and closely fit the interior marginal edge of said opening in said tank or other closed vessel, an annular washer of resilient material closely fitting the body of said union and disposed between the nut screw-threaded on the union and the external surface of said tank or other closed vessel when said union is in position.

In witness whereof I have hereunto affixed my signature this 4th day of May, 1927.

WILLIAM S. BREMER.